Figure 1:
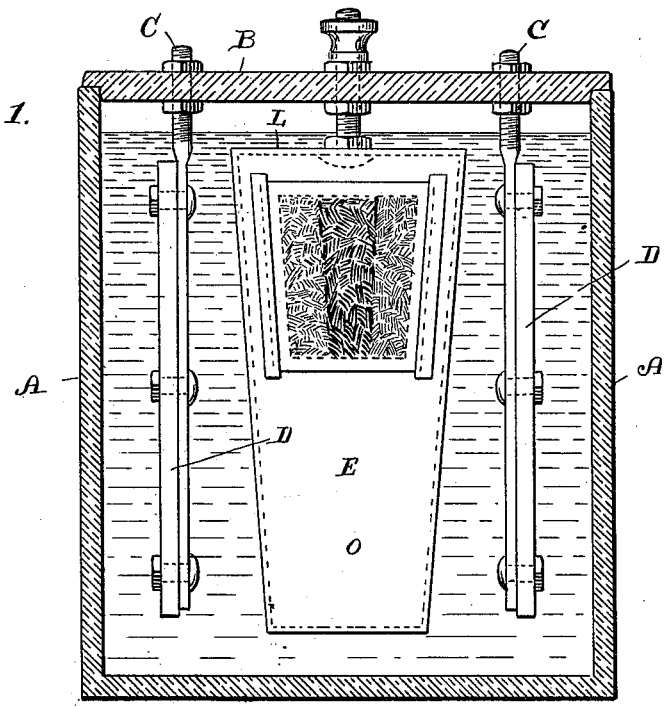

No. 664,008. Patented Dec. 18, 1900.
C. B. SCHOENMEHL.
GALVANIC BATTERY.
(Application filed Aug. 21, 1900.)
(No Model.) 2 Sheets—Sheet 1.

Witnesses
William V. Devitt
R. H. Newman

Inventor
CHARLES B. SCHOENMEHL
By Chamberlain & Newman
Attorneys

No. 664,008. Patented Dec. 18, 1900.
C. B. SCHOENMEHL.
GALVANIC BATTERY.
(Application filed Aug. 21, 1900.)

(No Model.) 2 Sheets—Sheet 2.

Witnesses
William V. Devitt
R. H. Newman

Inventor
CHARLES B. SCHOENMEHL
By Chamberlain & Newman
Attorneys

UNITED STATES PATENT OFFICE.

CHARLES B. SCHOENMEHL, OF WATERBURY, CONNECTICUT, ASSIGNOR TO THE WATERBURY BATTERY COMPANY, OF SAME PLACE.

GALVANIC BATTERY.

SPECIFICATION forming part of Letters Patent No. 664,008, dated December 18, 1900.

Application filed August 21, 1900. Serial No. 27,577. (No model.)

*To all whom it may concern:*

Be it known that I, CHARLES B. SCHOENMEHL, a citizen of the United States, and a resident of Waterbury, in the county of New Haven and State of Connecticut, have invented certain new and useful Improvements in Galvanic Batteries, of which the following is a specification.

My invention relates to new and useful improvements in galvanic batteries such as are used on track-circuit work and similar places and wherein oxid-of-copper scale, zinc, and a caustic solution constitute the essential elements. Oxid of copper such as is used in batteries of this class is black when first introduced for action, but with the operation of the battery and the consumption of said oxid of copper the latter undergoes a transformation of color, turning from the original black to a dull red. This coloration necessarily begins upon the outer or exposed side and adjacent to the coacting elements. Heretofore in the visible types of vertically-acting batteries the copper oxid would be consumed at the top in advance of the bottom and frequently upon the near edge in advance of the others, owing to the fact that the solution is stronger at the top. In my present invention I elect to place the oxid of copper in a suitable receptacle having perforated side walls which admit the solution and expose the copper oxid for action. Said receptacle is submerged within the solution of the battery and is so arranged that its element is exposed upon either side, causing the same to be consumed vertically. The solutions such as are used for batteries of this class are stronger at the top than at the bottom. Consequently they act more forcibly, with the objectionable result before stated. I have therefore found it necessary to provide means to insure the consumption of the oxid of copper at the bottom and front before the rear top is consumed.

It is therefore the object of my invention to provide an improved form of what I will term a "visible" battery—that is, a battery the conditions of the elements of which can readily be determined from the exterior and by a casual glance through the glass jar containing the same; further, to provide means to insure a more desirable transformation of the coloring and to cause the copper-oxid scale to be consumed upon the narrow edges slightly in advance of that on the back or broader edges.

With the above objects in view my invention resides and consists in the novel construction and combination of parts shown upon the accompanying two sheets of drawings, forming a part of this specification, in which similar characters of reference denote like or corresponding parts throughout the several figures, and of which—

Figure 2:
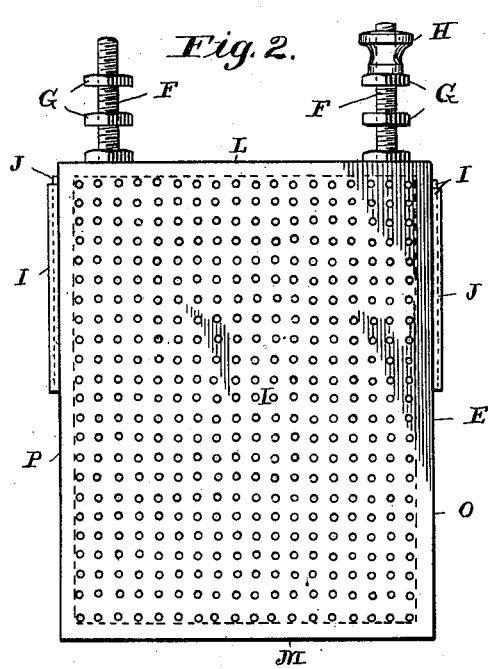
Figure 3:
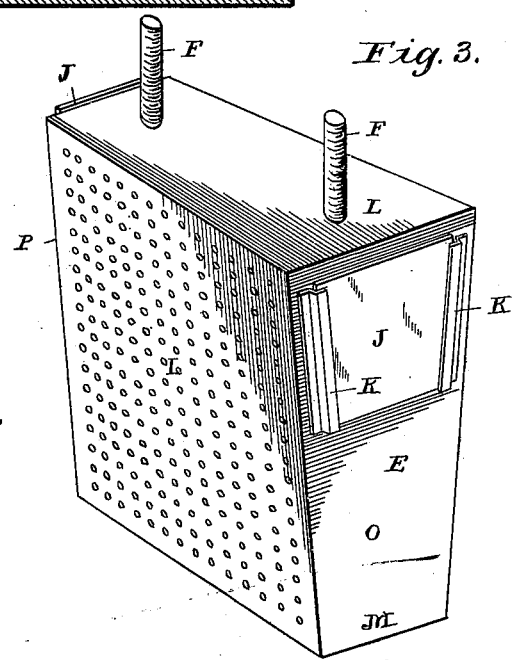
Figure 4:
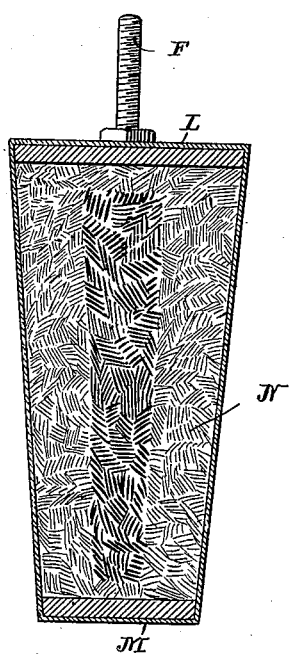
Figure 5:
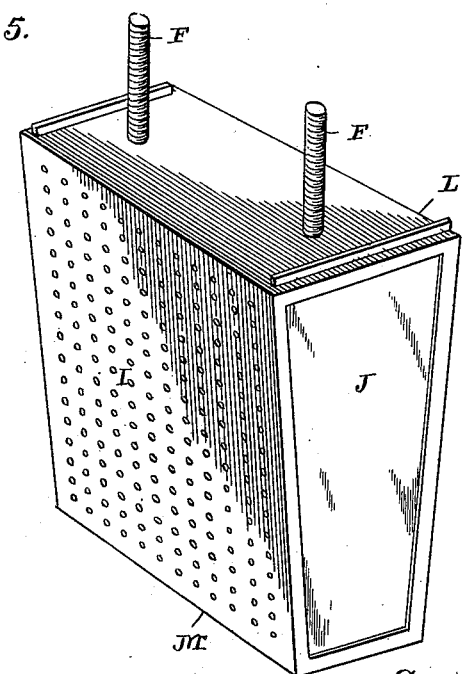

Figure 1 shows a central vertical cross-section through a battery provided with my improved negative pole. Fig. 2 is a detail side elevation of the negative element detached. Fig. 3 is a rear perspective view of the same. Fig. 5 is a vertical cross-section of the same element, and Fig. 5 is a perspective view of a slightly-modified form of construction of the negative elements.

Referring in detail to the characters of reference marked upon the drawings, A indicates the jar, and B the cover, both of which may be glass or porcelain of the usual construction.

C represents hangers by means of which the zinc elements D of the battery are detachably supported. Central of these zincs is suspended the oxid-of-copper receptacle E, forming the negative element of the battery, the same being secured to the cover B, before mentioned, by means of posts F F, having suitable jam-nuts G and a binding-screw H. The oxid-of-copper receptacle comprises a metallic casing, the sides I of which are preferably provided with perforations I, as shown. These perforations in practice serve to admit the solution and attack the copper oxid. Therefore it will be obvious that said copper oxid is consumed vertically and that the consumption begins adjacent to the perforated sides of the casing and gradually works inward from the two opposite sides until the entire quantity is consumed. As before stated, the solution is stronger at the top than at the bottom. Consequently the copper oxid is consumed more rapidly at that point than at the bottom. Therefore I have provided a larger bulk of material at said top than at the bottom, so as to have the two opposite colored sides meet substantially central. By reason of the above it will be seen that the copper scale will be consumed first through its lower edge M, then through its next narrower or front edge P, and finally through the back O. Thus in practice when the two colored bodies meet across the front there still remains a little life in the battery, as will yet appear from the central black line at the back. In practice I elect to recharge this battery as soon as the scale upon the front edge appears consumed.

I have constructed the receptacle wider at the top L than at the bottom M and also preferably narrower at the front P than at the back O. In the first four figures of the drawings the former construction is illustrated, while in Fig. 5 I have shown a receptacle substantially wedge-shaped or wider at the top than at the bottom without any difference in the width of the front and back edges. As will be apparent, both the front and back edges of the receptacle are provided with a glass J, which may be retained in position by suitable cleats K, as shown, or may be slipped through a slot in the top of the case and run down against the inside of the front edge. In my preferred form I have shown the glass extending but part way down the edge of the receptacle, while in the other figure it is shown extended the entire length. I do not therefore wish to be limited in this particular. Inasmuch as the thickness of the receptacle and bulk of copper oxid is greater upon the upper back edge, as shown in the preferred figures, it will be obvious that the element therein will be eaten or consumed quicker through the remaining thin diameters of the receptacle, consequently insuring the copper oxid to hold out longest adjacent to the rear glass, thus affording a positive and reliable means of ascertaining the conditions of the element, as will be apparent.

Having thus described my invention, what I desire to secure by Letters Patent is—

1. In a negative element for a battery, the combination of a copper-oxid chamber having one or more transparent edges and being of a greater diameter through its top than its bottom edge.

2. In a galvanic battery of the class described, a negative element comprising a metallic receptacle having perforated sides and one or more transparent edges, said receptacle being broader across its top surface than the bottom to insure the consumption of the oxid of copper at the bottom before the top.

3. A negative element for a galvanic battery, comprising a sheet-metal perforated receptacle, having a transparent face and being wider through its top and back edge adjacent to the said transparent face than the remaining edges, substantially as shown and described.

Signed at Bridgeport, in the county of Fairfield and State of Connecticut, this 7th day of August, A. D. 1900.

CHARLES B. SCHOENMEHL.

Witnesses:
 C. M. NEWMAN,
 WILLIAM V. DEVITT.